United States Patent [19]

Clegg

[11] Patent Number: 4,621,908
[45] Date of Patent: Nov. 11, 1986

[54] MONOCHROMATIC BEAM CONCENTRATOR

[76] Inventor: John E. Clegg, 2320 Keystone Dr., Orlando, Fla. 32806

[21] Appl. No.: 658,936

[22] Filed: Oct. 9, 1984

[51] Int. Cl.$^4$ .................. G02B 13/18; G02B 1/06; F24J 2/04; F24J 2/08
[52] U.S. Cl. .................. 350/432; 126/437; 126/440; 350/418
[58] Field of Search .................. 350/432–435, 350/418; 126/437, 440

[56] References Cited

U.S. PATENT DOCUMENTS

| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,556,294 | 12/1985 | Clegg | 350/432 |

OTHER PUBLICATIONS

Yaffee et al; "Adjusting the Collection Angle of a Conical Lens by Immersion in a Liquid"; *Applied Optics*; vol. 9, No. 10, Oct. 1970; p. 2389.

*Primary Examiner*—John K. Corbin
*Assistant Examiner*—Scott J. Sugarman

[57] ABSTRACT

An upper stage lens which receives a convergent conical incipient beam and emits a concentrated whole beam into a lower stage lens which emits a concentrated whole beam. The upper stage lens is located on the roof of a building and projects a beam through a light conduit to the lower stage lens in the room below. A chamber into which various colored water solutions can be pumped is located in the conduit above the lower stage lens.

1 Claim, 2 Drawing Figures

MONOCHROMATIC BEAM CONCENTRATOR

BACKGROUND

The code designation of the concentrator is 3RT:CM (R—refracting section of a stage or component lens, T—transmitting section of a stage or component lens, C—concentrating stage lens, and M—monochromatic).

Prior art is limited to conical beam concentrators which receive circular whole beams and emit concentrated whole beams which are not monochromatic.

DRAWINGS

DESCRIPTION

Figure 1:
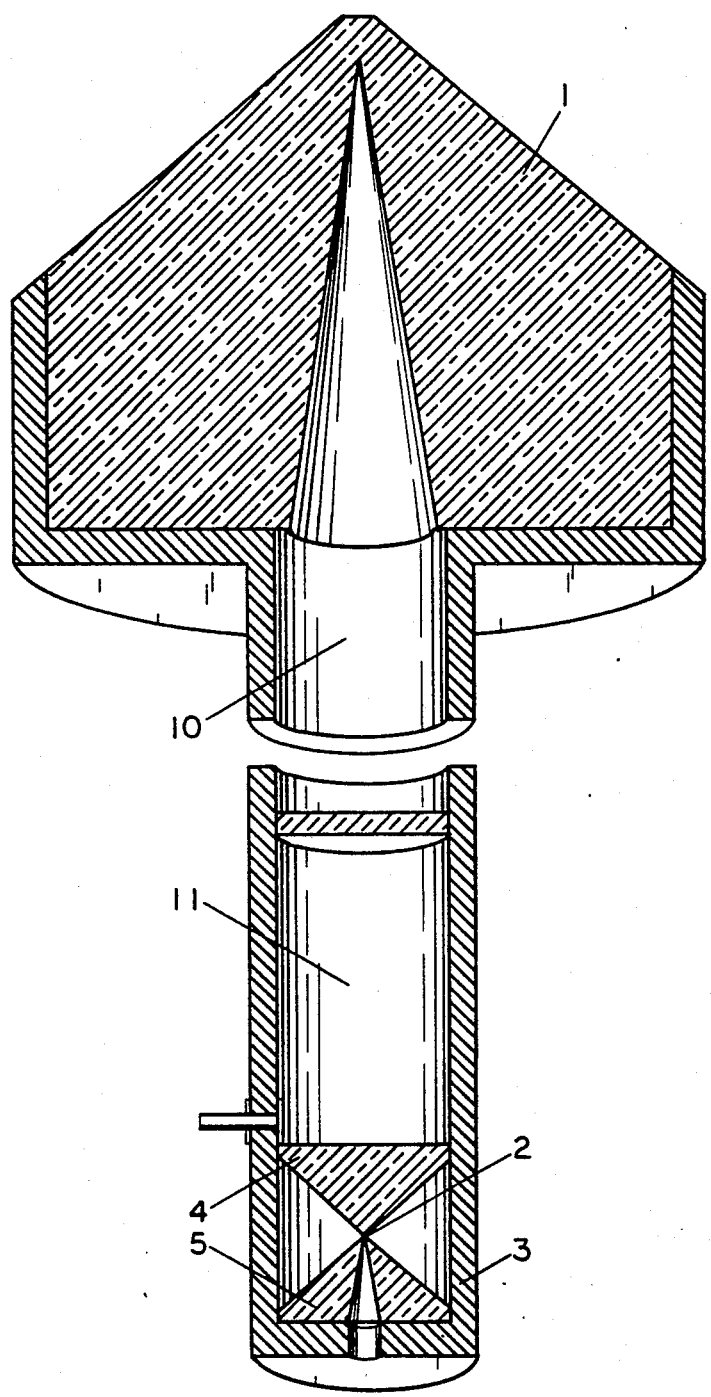
FIG. 1 is an elevation of the monochromatic beam concentrator with the lenses shown in section.

FIG. 1 shows the monochromatic beam concentrator 3RT:CM with upper stage lens RT 1 mounted above lower stage lens 2RT 2 inside casing 3. Lower stage lens 2RT 2 consists of upper component lens RT 4 and lower component lens RT 5.

Upper stage lens RT 1 is mounted on the roof of a building so as to receive a convergent conical incipient beam of diffused sunlight which is projected through a light conduit to the lower stage lens in the room below. A chamber into which various colored water solutions can be pumped is located in the conduit above the lower stage lens.

Figure 2:
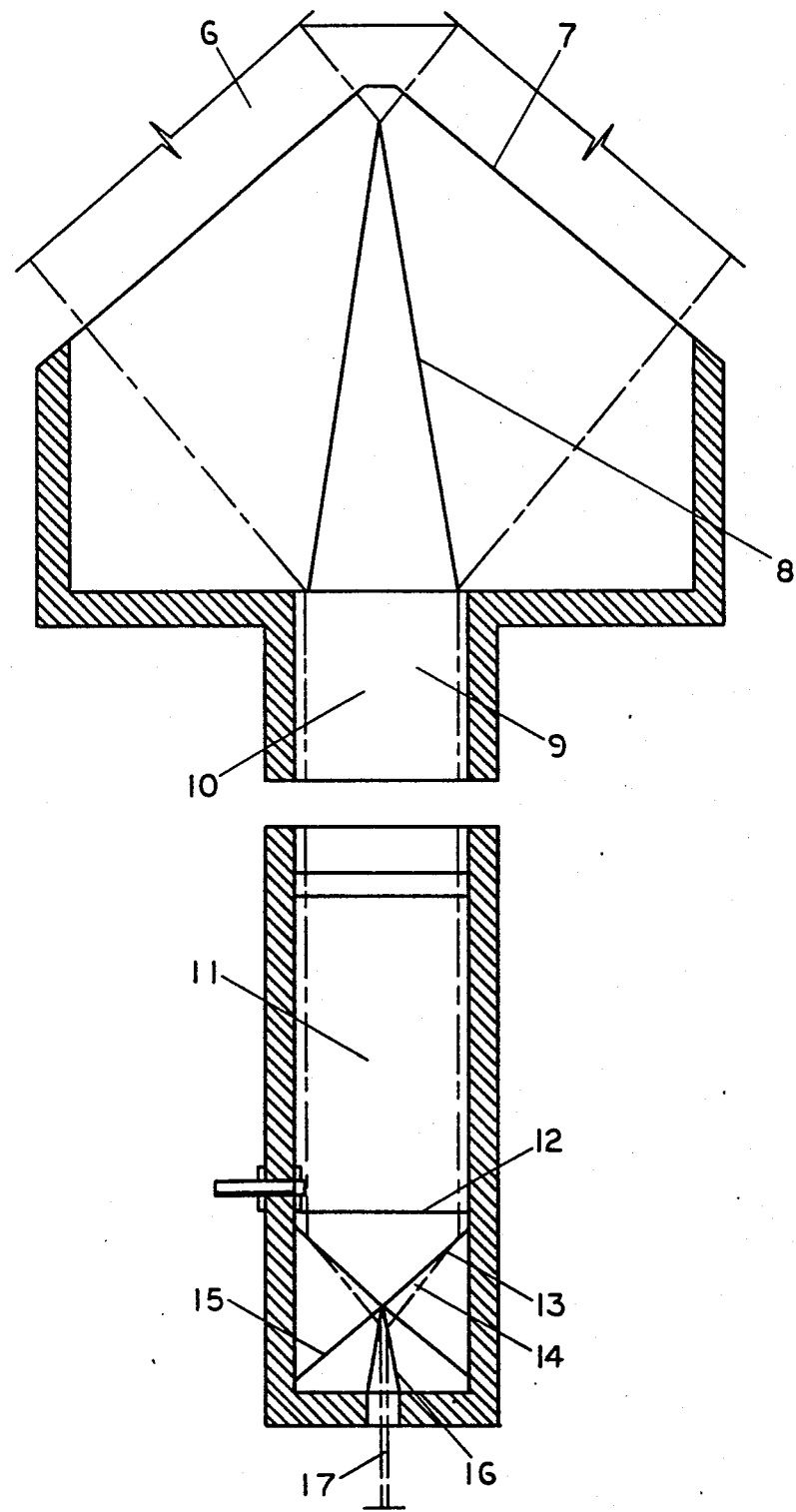
FIG. 2 is an elevation of the concentrator with a ray diagram.

FIG. 2 is an elevation of the monochromatic beam concentrator with a ray diagram. Convergent conical incipient beam 6 of diffused sunlight is received by convex conical section 7 and transmitted to concave conical section 8 which refracts the beam, forming concentrated whole beam 9.

Beam 9 is projected through tubular light conduit 10, passes through fluid chamber 1 and is transmitted by planar section 12 and refracted by convex conical section 13, forming convergent conical beam 14.

Beam 14 is transmitted by convex conical section 15 and refracted by concave conical section 16, forming concentrated whole beam 17 which is emitted parallel to the vertical optic axis of the concentrator.

I claim:

1. A monochromatic beam concentrator comprising in general an upper stage lens which receives a convergent conical incipient beam of diffused sunlight, a colored-water fluid chamber mounted below the upper stage lens so as to transmit the beam emitted by the upper stage lens, and a lower stage lens mounted below the fluid chamber so as to concentrate the beam emitted by the fluid chamber, and comprising in particular;

an upper stage lens RT (1) having a convex conical section (7) which receives and transmits a convergent conical incipient beam (6) of diffused sunlight, and having a concave conical section (8) which refracts and emits said convergent conical incipient beam (6), forming a concentrated whole beam (9), a tubular light conduit (10) mounted vertically below said upper stage lens RT (1) so as to transmit and emit said concentrated whole beam (9), a fluid chamber (11) mounted below said tubular light conduit (10) and vertically aligned therewith so as to transmit and emit said concentrated whole beam (9), and a lower stage lens 2RT (2) mounted below said fluid chamber (11) and comprising an upper component lens RT (4) having a planar section (12) which receives and transmits said concentrated whole beam (9) and having a convex conical section (13) which refracts and emits said concentrated whole beam (9), forming a convergent conical beam (14), and comprising a lower component lens RT (5) having a convex conical section (15) which transmits said convergent conical beam (14) and having a concave conical section (16) which refracts and emits said convergent conical beam (14), forming a concentrated whole beam (17) which is emitted parallel to the vertical optic axis of the beam concentrator.

* * * * *